United States Patent
Yamaguchi

(10) Patent No.: US 8,596,829 B2
(45) Date of Patent: Dec. 3, 2013

(54) LIGHT FLUX CONTROLLING MEMBER, LIGHT EMITTING APPARATUS, SURFACE LIGHT SOURCE APPARATUS AND DISPLAY APPARATUS

(75) Inventor: Masao Yamaguchi, Saitama (JP)

(73) Assignee: Enplas Corporation, Saitama (JP)

( * ) Notice: Subject to any disclaimer, the term of this patent is extended or adjusted under 35 U.S.C. 154(b) by 593 days.

(21) Appl. No.: 12/861,012

(22) Filed: Aug. 23, 2010

(65) Prior Publication Data
US 2011/0044053 A1 Feb. 24, 2011

(30) Foreign Application Priority Data

Aug. 24, 2009 (JP) .................................. 2009-193553

(51) Int. Cl.
F21V 7/07 (2006.01)
F21V 7/09 (2006.01)

(52) U.S. Cl.
USPC ................. 362/296.05; 362/246; 362/296.07; 362/334; 362/335

(58) Field of Classification Search
USPC .......... 362/246, 296.01, 296.05, 296.07, 334, 362/335, 340, 361
See application file for complete search history.

(56) References Cited

U.S. PATENT DOCUMENTS

| 2006/0066218 | A1 | 3/2006 | Yamaguchi et al. |
| 2008/0007966 | A1* | 1/2008 | Ohkawa ......................... 362/608 |
| 2008/0013322 | A1* | 1/2008 | Ohkawa ......................... 362/311 |
| 2008/0298060 | A1* | 12/2008 | Ohkawa ......................... 362/240 |
| 2009/0052192 | A1* | 2/2009 | Kokubo et al. ........... 362/311.09 |
| 2009/0116245 | A1* | 5/2009 | Yamaguchi .............. 362/311.01 |
| 2009/0225550 | A1* | 9/2009 | Yamaguchi ................... 362/294 |
| 2011/0063850 | A1* | 3/2011 | Oide et al. ............... 362/296.01 |

FOREIGN PATENT DOCUMENTS

| JP | 2006-092983 A | 4/2006 |
| JP | 2007-059489 A | 3/2007 |
| JP | 2007-115424 A | 5/2007 |

* cited by examiner

Primary Examiner — Anh Mai
Assistant Examiner — Kevin Quarterman
(74) Attorney, Agent, or Firm — Washida & Associates

(57) ABSTRACT

A light flux controlling member has a flange projecting outward of a radial direction of a light controlling emission surface and leg parts arranged within a range of area width L in a back surface and on the reference optical axis side of the boundary between the flange and the light controlling emission surface, and L is given by L=t×tan(α−β), where: t is the thickness of the flange or the height from the back surface to the outermost rim part; α is an angle of incidence of a light parallel to the reference optical axis and incident on the light controlling emission surface in the outermost rim part; and β is an angle of emission, from the light controlling emission surface, of a refraction light generated when the light parallel to the reference optical axis is incident on the light controlling emission surface from the outermost rim part.

11 Claims, 12 Drawing Sheets

(a)

(b)

US 8,596,829 B2

LIGHT FLUX CONTROLLING MEMBER, LIGHT EMITTING APPARATUS, SURFACE LIGHT SOURCE APPARATUS AND DISPLAY APPARATUS

CROSS REFERENCE TO RELATED APPLICATIONS

The disclosure of Japanese Patent Application No. 2009-193553, filed on Aug. 24, 2009, including the specification, drawings and abstract, is incorporated herein by reference in its entirety.

TECHNICAL FIELD

The present invention relates to a light flux controlling member, a light emitting apparatus, a surface light source apparatus and a display apparatus. More particularly, for example, the present invention relates to a light flux controlling member that is used as various illuminations such as a light source of a backlight for illuminating a liquid crystal panel from its back surface side and general interior illumination, a light emitting apparatus, a surface light source apparatus used for various illuminations and a display apparatus that combines the surface light source apparatus as the illuminating means with an object-to-be-illuminated for use.

BACKGROUND ART

Conventionally, as an illuminating means for a liquid crystal display monitor used in a personal computer, a television and the like, a surface light source apparatus using a plurality of light emitting diodes (LEDs) as spot light sources is known.

With a surface light source apparatus, a plurality of LEDs are arranged in a matrix pattern in the back surface of a flat diffusing member having virtually the same shape as a liquid crystal display panel of a liquid crystal display monitor. The surface light source apparatus allows lights emitted from the LEDs to be incident inside the diffusing member from the back surface of the diffusing member, and emits the lights incident inside the diffusing member, from the emission surface facing the back surface of the diffusing member. The surface light source apparatus can perform planar illumination of the liquid crystal display panel by these emission lights.

Further, a light emitting apparatus that combines LEDs with lens bodies and that controls traveling directions of lights emitted from the LEDs, by the lens bodies is known. This light emitting apparatus requires a configuration for adjusting the positions of the lens bodies with respect to the LEDs.

Patent Literature 1 discloses a lens body formed with a lens part and a position adjusting part that is made of an elastic material and that adjusts the position of the lens part with respect to the LED. A fitting part that fits with the LED substrate is formed in this position adjusting part. Compared to the case where a lens part and a position adjusting part are integrally made of, for example, a PMMA (poly(metylo methacrylate)) material, the invention of Patent Literature 1 solves the problem that the lens body is broken by the stress concentrated on the fitting part, and makes it easy to manufacture lens bodies and adjust the positions of the lens bodies.

Further, Patent Literature 2 discloses a light emitting apparatus that controls traveling directions of lights emitted from light emitting elements (i.e. LEDs) by light flux controlling members. This Patent Literature 2 does not mention to a method of fixing the light flux controlling members to LED substrates.

FIG. 1 is a plan view of a surface light source apparatus forming a conventional display apparatus disclosed in Patent Literature 2, where an object-to-be-illuminated of, for example, a liquid crystal display panel is removed. FIG. 2 is a cross-sectional view of a display apparatus cut along X1-X1 line of FIG. 1.

As shown in FIG. 1, surface light source apparatus 1 has: flat light diffusing member 2 that is arranged in the back surface of an object-to-be-illuminated such as a liquid crystal display panel and that has virtually the same shape as the object-to-be-illuminated; a plurality of light emitting elements 3 of spot light sources that are arranged at pitches P of virtually equal intervals on the back surface of light diffusing member 2; and light flux controlling members 4 that control the traveling directions of lights emitted from light emitting elements 3.

Above light emitting element 3 and light flux controlling member 4 form light emitting apparatus 5.

As shown in FIG. 2, display apparatus 6 is formed with surface light source apparatus 1; and object-to-be-illuminated 7 arranged on the emission surface 8 (the surface opposite to back surface 9) side of light diffusing member 2.

Light diffusing member 2 is formed in a sheet shape or a planar flat shape using a resin material such as PMMA (poly (metylo methacrylate)) or PC (Polycarbonate) having superior optical transparency. Light diffusing member 2 is formed in virtually the same size as a planar shape of the object-to-be-illuminated such as a liquid crystal display panel, an advertisement display panel and a signpost display panel.

In light diffusing member 2, fine concavities and convexities (prism projections, or concavities and convexities formed by diffusing processing such embossing treatment or beads coating) are formed on its surface, or, inside light diffusing member 2, a diffusing member is mixed.

Light diffusing member 2 allows transmission of lights emitted from light controlling emission surfaces 11 of light flux controlling members 4 and diffuses the lights, and makes the lights radiated on the object-to-be-illuminated uniform.

Light emitting elements 3 are, for example, LEDs. Light emitting elements 3 are arranged in a matrix pattern in the back surface of light diffusing member 2.

Light flux controlling member 4 is an expanding lens that controls the traveling direction of a light emitted from light emitting element 3, and is, for example, an aspheric lens. Light flux controlling member 4 is made of, for example, a transparent resin material such as PMMA (poly(metylo methacrylate)), PC (polycarbonate), and EP (epoxy resin), or a transparent glass.

Light flux controlling member 4 has: light controlling emission surface 11 that has a virtually circular planar shape and that controls the traveling direction of a light emitted from light emitting element 3; concavity 13 that allows incidence of a main beam including lights emitted in the direction of the reference optical axis among lights emitted from light emitting element 3; and back surface 12 that radially extends from the opening rim part of this concavity 13 and that allows incidence of a subbeam emitted from light emitting element 3 at a large angle with respect to the reference optical axis. Further, light flux controlling member 4 has flange upper surface 14a of a virtually annular shape that projects outward of the radial direction of light controlling emission surface 11; flange lateral surface 14b that connects the outer rim part of flange upper surface 14a and the outer rim part of back surface 12; and leg parts 15 of a round stick shape that attach light flux controlling member 4 in a state where the position of light flux controlling member 4 is determined with respect to base plate 17. The portion surrounded by back surface 12, flange upper surface 14a, flange lateral surface 14b and a virtual surface (i.e. the inner peripheral surface of flange 14) that passes the inner rim part of flange upper surface 14a and that is orthogonal to back surface 12, is flange 14, and the area of flange 14 of back surface 12 is lower flange surface 14c.

Light controlling emission surface 11 is projected higher (toward light diffusing member 2) than flange upper surface 14a.

Leg parts 15 fix light flux controlling member 4 to surface 17a of substrate 17 in a predetermined position and at a height, and three leg parts 15 are formed at equal intervals in lower flange surface 14c. Leg parts 15 are glued by adhesive 16 (see FIG. 3(b) described later) in a state where the position of light flux controlling member 4 is determined with respect to surface 17a of substrate 17.

Legs 15 are made of the same material and formed integrally with light flux controlling member 4.

When light flux controlling member 4 is attached to substrate 17, gap ε is formed between the light emission surface of light emitting element 3 and back surface 12 of light flux controlling member 4. Gap ε is formed to, for example, discharge heat discharged from light emitting element 3, from gap ε in a state where light flux controlling member 4 is placed on substrate 17 such that light emitting element 3 is accommodated in concavity 13.

FIG. 3 explains the influence when leg parts 15 of light flux controlling member 4 are glued to surface 17a of substrate 17, and FIG. 3(a) is a plan view of light flux controlling member 4 seen from above and FIG. 3(b) is a magnified view of leg part 15 of FIG. 3(a).

As shown in FIG. 3(a), three leg parts 15 are formed at equal intervals in lower flange surface 14c (see FIG. 2), and are glued to surface 17a of substrate 17 by adhesive 16 (see FIG. 3(b)).

Adhesive 16 is made from a thermoset resin, and fixes leg parts 15 on substrate 17 by hardening the resin by heat. For this use, a black thermoset adhesive that hardens at a predetermined temperature and that provides a sufficient adhesive strength is known.

CITATION LIST

Patent Literature

PTL 1: Japanese Patent Application Laid-Open No. 2007-059489
PTL 2: Japanese Patent Application Laid-Open No. 2006-092983

SUMMARY OF INVENTION

Technical Problem

However, with the lens body disclosed in Patent Literature 1, the lens part and the position adjusting part are made of different materials, and therefore cost of the lens body increases.

Further, in case where leg parts 15 are formed in flange 14 of light flux controlling member 4 disclosed in Patent Literature 2 and are mounted on substrate 17 by black adhesive 16, there are cases where lights are absorbed by adhesive 16 portions, influencing the display surface of light flux controlling member 4. Further, as shown in FIG. 3(a), when seen from the upper surface, the positions of leg parts 15 glare in light diffusing member 2 (FIG. 2), and therefore the uniformity of brightness becomes uneven. Further, as shown in FIG. 2, when many light flux controlling members 4 are aligned, the above unevenness in the uniformity of brightness produces a vague dark line in light diffusing member 2 (FIG. 2). The unevenness in the uniformity of brightness prevents uniform planar illumination, and decreases illumination quality.

An object of the present invention is to provide a light flux controlling member, a light emitting apparatus, a surface light source apparatus and a display apparatus that can provide a surface-to-be-illuminated of highly uniform brightness in case where a light flux controlling portion and a position adjusting portions (i.e. leg parts) are formed integrally and the leg parts are glued to the substrate by an adhesive with light absorbing characteristics.

Solution to Problem

The light flux controlling member according to the present invention employs a configuration which includes: a light controlling emission surface that controls an emission direction of light emitted from a light emitting element; a back surface that is oppositely located the light controlling emission surface and that forms a bottom part; and a leg part that is formed to project from the back surface toward an opposite side of the light controlling emission surface, and in which, in case where a light flux parallel to a reference optical axis, which is a traveling direction of light in a center of an emitted light flux, is incident on the light flux controlling member from the entire light controlling emission surface as an incident light flux, the leg part is formed in a blind angle area where the incident light flux does not directly reach the back surface from the light controlling emission surface.

The light emitting apparatus according to the present invention employs a configuration which includes: a light emitting element that is aligned on a substrate and that emits light; and a light flux controlling member that has: a light controlling emission surface that controls an emission direction of light emitted from the light emitting element; a back surface that is oppositely located the light controlling emission surface and that forms a bottom part; and a leg part that is arranged in the back surface, and in which the leg part is arranged within a range of area width L given according to a following equation, inside a virtual circle on the back surface, the virtual circle adopting as a radius a distance between a reference optical axis and a foot of a perpendicular line drawn from a random point on an outermost rim part of the light controlling emission surface to the back surface, $$L = t \times \tan(\alpha - \beta)$$

where:
t is a distance from the foot of the perpendicular line on the back surface to the outermost rim part;
α is an angle of incidence of light that is parallel to the reference optical axis and that is incident on the light controlling emission surface in the outermost rim part; and
β is an angle of emission of a refraction light that is generated when the light parallel to the reference optical axis is incident on the outermost rim part, and that is emitted from the light controlling emission surface.

The light emitting apparatus according to the present invention employs a configuration which includes: a light emitting element that is aligned on a substrate and that emits light; and a light flux controlling member that comprises: a light controlling emission surface that controls an emission direction of light emitted from the light emitting element; a back surface that is oppositely located the light controlling emission surface and that forms a bottom part; a flange that projects outward of a radial direction of the light controlling emission surface; and a leg part that is arranged in the back surface comprising the flange, and in which the flange has a groove of a concave shape on the light controlling emission surface facing the leg part.

The light emitting apparatus according to the present invention which includes: a light emitting element that is aligned on a substrate and that emits light; and a light flux controlling member that has: a light controlling emission surface that controls an emission direction of light emitted from the light emitting element; a back surface that is oppositely located the light controlling emission surface and that forms a bottom part; a virtually annular flange that projects outward of a radial direction of the light controlling emission surface; and a leg part that is arranged in the back surface having the flange, and in which the leg part has a retroreflection structure to retroreflect light incident on and through the light controlling emission surface.

The surface light source apparatus according to the present invention which includes: one of the light flux controlling member and the light emitting apparatus; and a light diffusing member that allows light emitted from the light emitting apparatus to be diffused and transmitted.

The display apparatus according to the present invention employs a configuration which includes: the surface light source apparatus; and an object-to-be-illuminated on which the light emitted from the surface light source apparatus is radiated.

Advantageous Effects of Invention

According to the present invention, in case where a light flux controlling member is mounted on a substrate, even if a light is absorbed in an adhesive portion, leg parts arranged in a ring area of area width L and the adhesive are not seen from directly above the light flux controlling member, so that it is possible to prevent the trouble that a display surface of the light flux controlling member is influenced and prevent unevenness in the uniformity of brightness due to the glueing of the leg parts. Consequently, it is possible to make illumination lights of the light flux controlling member uniform, and have quality illumination.

DESCRIPTION OF EMBODIMENTS

Hereinafter, embodiments of the present invention will be explained in detail with reference to the accompanying drawings.

Embodiment 1

Figure 1:
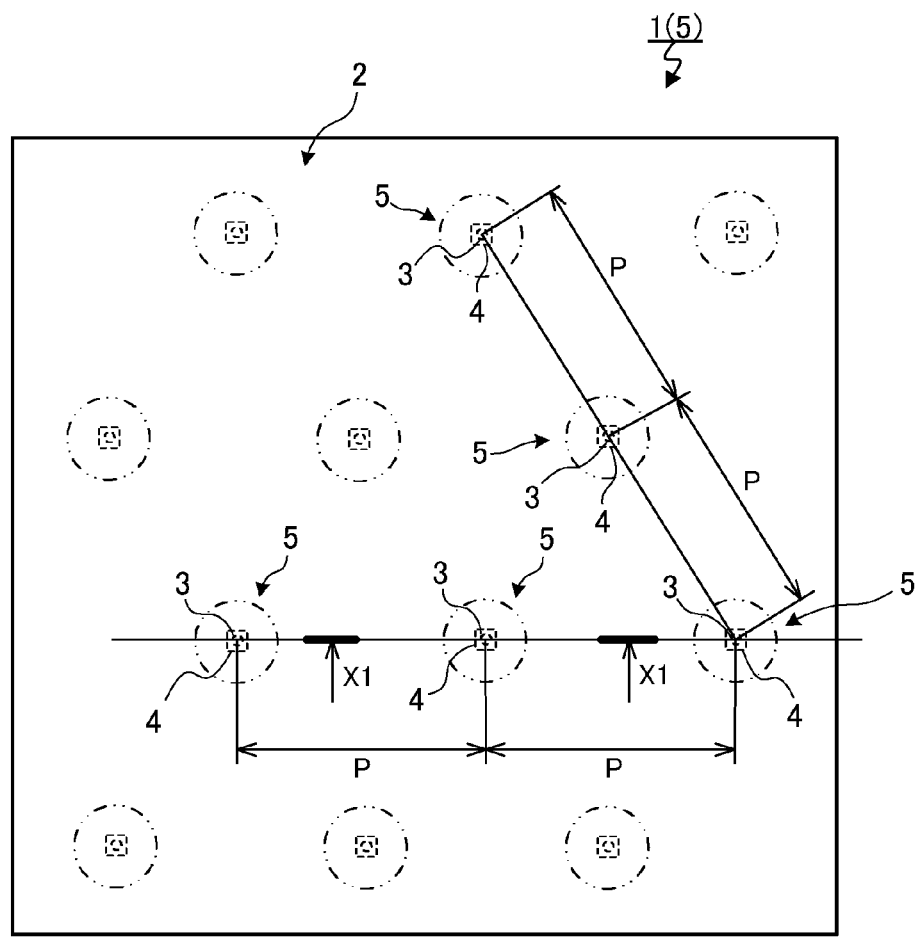
FIG. 1 is a plan view of a surface light source apparatus forming a conventional display apparatus.
Figure 2:
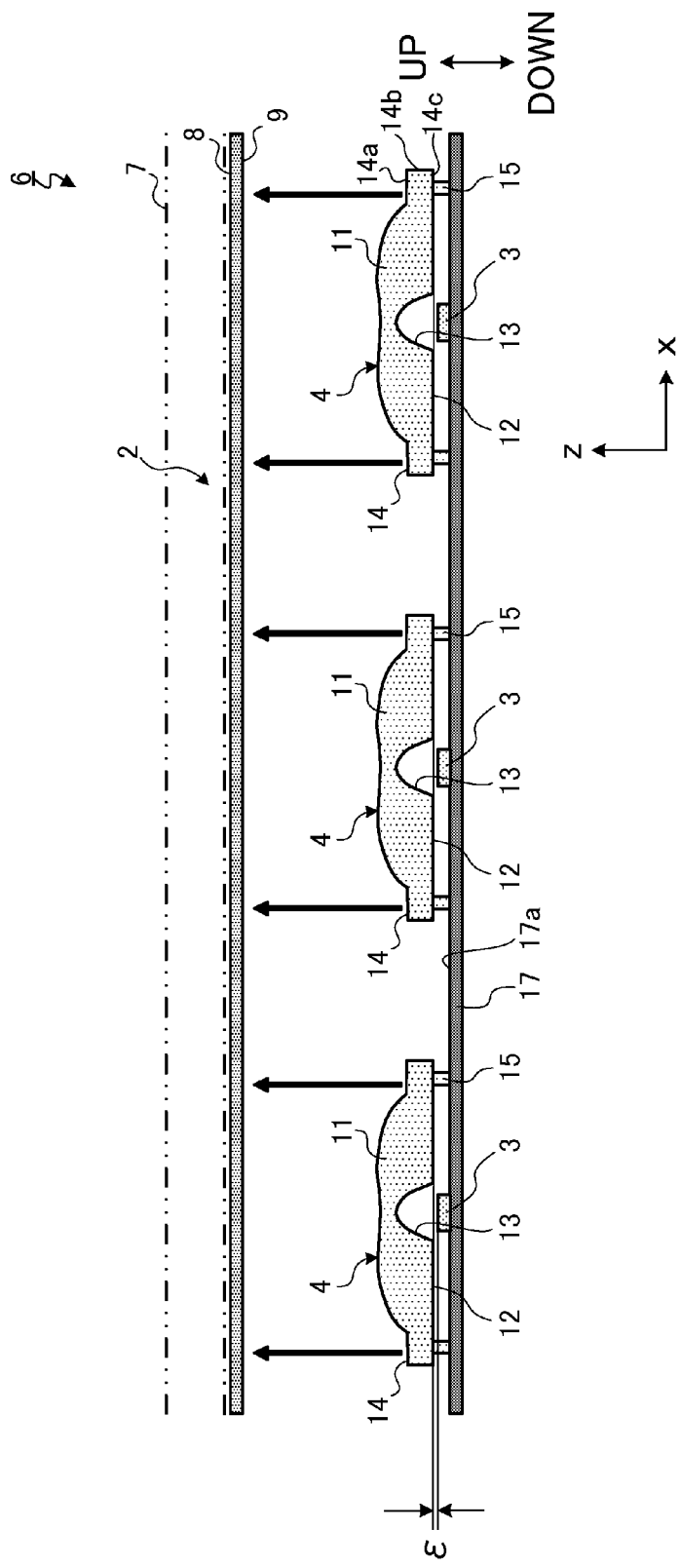
FIG. 2 is a cross-sectional view of a display apparatus cut along X1-X1 line of FIG. 1.
Figure 3:
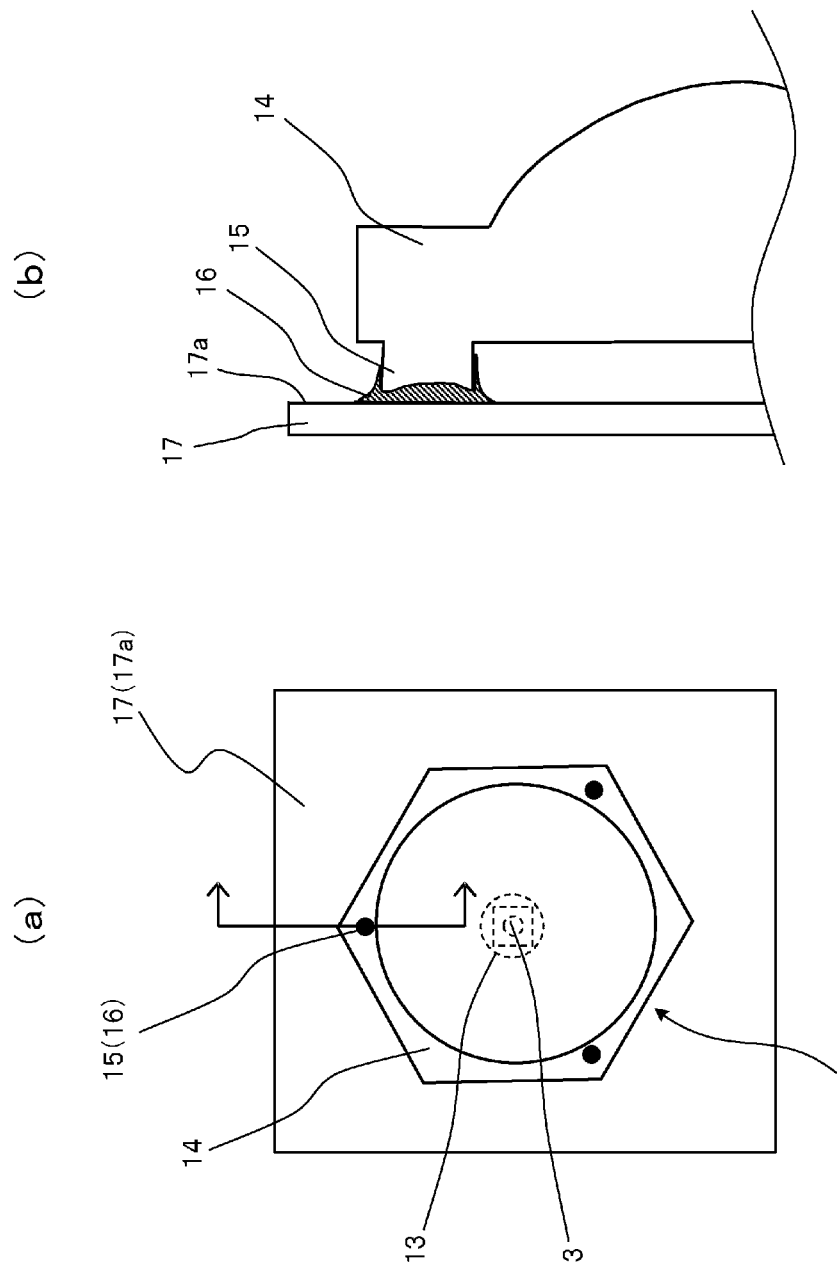
FIG. 3 illustrates the influence when leg parts of a conventional light flux controlling member are glued to a surface of a substrate.
Figure 4:
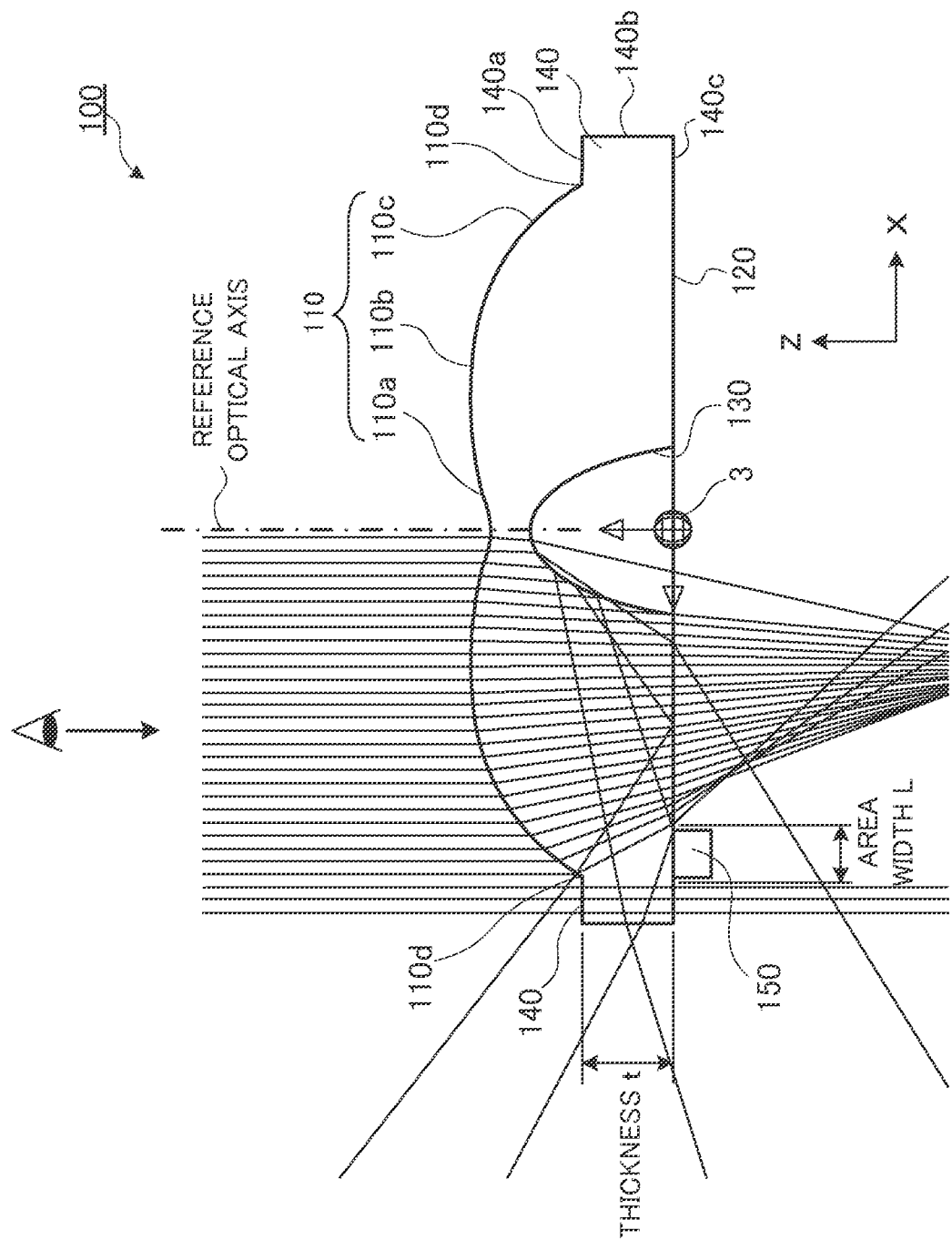
FIG. 4 shows a detailed configuration of a light flux controlling member of a surface light source apparatus forming a display apparatus according to Embodiment 1 of the present invention.

FIG. 4 shows a detailed configuration of a light flux controlling member according to Embodiment 1 of the present invention. The light flux controlling member according to the present invention is applicable to surface light source apparatus 1 and the liquid crystal panel of FIG. 1. Light flux controlling member 100 according to the present embodiment is used instead of light flux controlling member 4 of FIG. 1 to FIG. 3. Further, the reference optical axis refers to the traveling direction of lights in the center of a three-dimensional emission light flux emitted from light flux controlling member 100. A case will be explained with the present embodiment where the optical axes of light emitting elements 3 match the reference optical axis.

Light flux controlling member 100 is an expanding lens that controls the traveling direction of a light emitted from light emitting element 3, and is, for example, an aspheric lens. Light flux controlling member 100 is made of, for example, a transparent resin material such as PMMA (poly(metylo methacrylate)), PC (polycarbonate), and EP (epoxy resin), or a transparent glass.

Light flux controlling member 100 has: light controlling emission surface 110 that has a virtually circular planar shape and that controls the traveling direction of a light emitted from light emitting element 3; concavity 130 that allows incidence of a main beam including lights emitted in the direction of the reference optical axis among lights emitted from light emitting elements 3; and back surface 120 (i.e. bottom surface) that radially extends from the opening rim part of this concavity 13 and that allows incidence of a sub-beam emitted from light emitting element 3 at a large angle with respect to the reference optical axis. Further, light flux controlling member 100 has: flange 140 of a virtually annular shape that projects outward of the radial direction of light controlling emission surface 110; and leg parts 150 of a round stick shape that are arranged in the range of area width L, in back surface 120 and near flange 140. The upper surface (the light diffusing member side) of flange 140 is upper flange surface 140a, the outer surface of flange 140 is lateral flange surface 140b, and the surface that is positioned to opposite upper flange surface 140a and that forms part of back surface 120 is lower flange surface 140c.

Light controlling emission surface 110 is projected higher (toward the light diffusing member) than upper flange surface 140a. Light controlling emission surface 110 is formed with: first emission surface 110a that is positioned in a predetermined range around optical axis L; second emission surface 110b that is formed to continue to the circumference of first emission surface 110a; and third emission surface 110c that connects second emission surface 110b and upper flange surface 140a.

First emission surface 110a has a smooth curved shape denting downward, that is, has a dented shape cutting part of a ball. Further, second emission surface 110b has a smooth curved shape projecting upward and that is formed to continue to first emission surface 110a, and its planar shape is formed in a virtually hollow disc shape surrounding first emission surface 110a. Although third emission surface 110c has an inclining surface that is virtually linear in the cross-section passing reference optical axis L, as long as this shape does not prevent lights from being emitted from light flux controlling member 100 uniformly in a wide range, it may have a shape with a curved cross-section connected smoothly with second emission surface 110b.

Leg parts 150 fix light flux controlling member 100 to surface 17a of substrate 17 in a predetermined position and at a height, and three leg parts 150 are formed at intervals. With the present embodiment, three leg parts 150 are formed at an equal distance from the reference optical axis and at equal intervals. Leg parts 150 are glued by an adhesive (not shown) in a state where the position of light flux controlling member 100 is determined in the surface of the substrate.

When light flux controlling member 100 is attached to surface 17a of substrate 17, gap ϵ is formed between the light emission surface of light emitting element 3 and back surface 120 of light flux controlling member 100. Gap ϵ is formed to, for example, discharge heat discharged from light emitting element 3, from gap ϵ in a state where light flux controlling member 100 is placed on the substrate such that light emitting element 3 is accommodated in concavity 13.

Leg parts 150 are glued to surface 17a of substrate 17 by an adhesive.

As described above, the adhesive is made from a thermoset resin, and fixes leg parts 150 on the substrate by hardening the resin by heat. Almost every thermoset resin for this use is presently colored black or ginger.

[Positions to Form Leg Parts 150]

Features of the present invention lie in positions to form leg parts 150 arranged in back surface 120 of light flux controlling member 100.

Leg parts 150 are arranged within the range of area width L in back surface 120 of light flux controlling member 100. The area of area width L is a blind angle area in back surface 120 where lights do not reach when the lights directly propagate from light controlling emission surface 110 toward back surface 120 in case where a parallel light flux parallel to the reference optical axis is incident on light flux controlling member 100 from the entire surface of light controlling emission surface 110. Details will be explained below.

Figure 5:
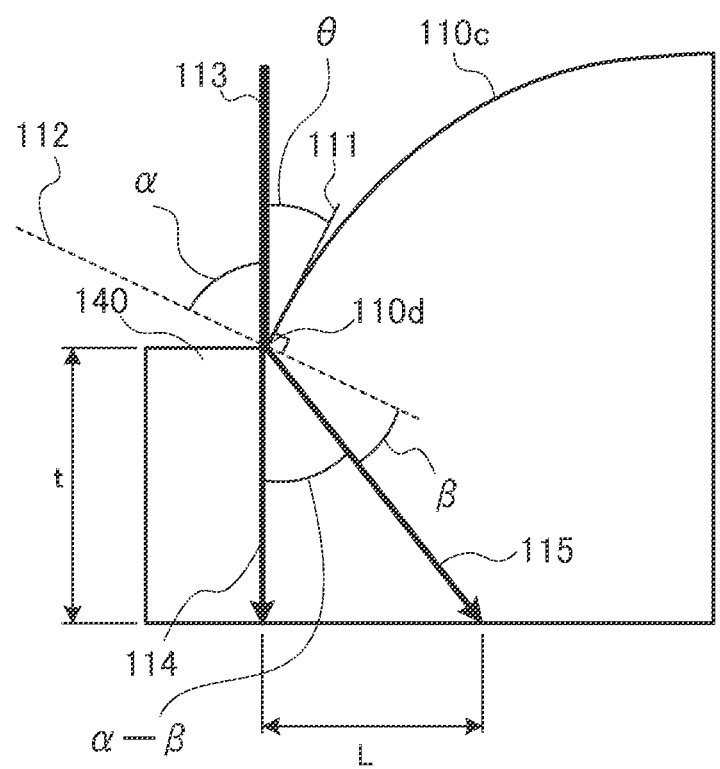
FIG. 5 illustrates area width L which is the position to attach leg parts arranged in a back surface of a light flux controlling member according to above Embodiment 1.

FIG. 5 illustrates area width L which is the position to form leg parts 150 to be arranged in back surface 120 of light flux controlling member 100 of FIG. 4.

As shown in FIG. 5, third emission surface 110c of light controlling emission surface 110 of light flux controlling member 100 intersects flange 140 at a predetermined angle. Now, the intersecting point between third emission surface 110c and flange 140 will be focused upon. Tangent 111 is drawn on this third emission surface 110c, and its normal line 112 is represented by the broken line. Beam 113 that is parallel to the reference optical axis and that is incident on outermost rim part 110d of light controlling emission surface 110 from directly above (from the light diffusing member side) light flux controlling member 100 is represented by the bold solid line. The angle formed by tangent 111 of third emission surface 110c and the reference optical axis is inclining angle θ (equivalent to the angle formed by tangent 111 and beam 113 parallel to the reference optical axis), and the angle formed by normal line 112 and refracted light 115 generated when beam 113 is incident on light controlling emission surface 110 from outermost rim part 110d is the angle of emission β.

Beam 113 is incident from air (i.e. first medium: $n_{air}$), on a transparent resin material and the like (i.e. second medium: $n_{pmma}$) of light flux controlling member 100 at an angle of incidence α. Therefore, part of an incident light is refracted in the incident surface, toward the reference optical axis of light flux controlling member 100. That is, incident beam 113 is split into light 114 (i.e. direct light) that travels direct in the same direction as beam 113, and light 115 (i.e. refracted light) that is refracted toward the reference optical axis of light flux controlling member 100. The width between the points in back surface 120 (see FIG. 4) of light flux controlling member 100 where these direct light 114 and refracted light 115 reach, is the blind angle area, and is area width L.

Area width L is given by following equation 2 when parameters are defined according to following equation 1. Note that $n_{pmma}$ is the refractive index of a transparent resin material and the like of light flux controlling member 100, and t is the thickness of flange 140.

$n_{pmma} \sin β = n_{air} \sin α$ $n_{pmma} \sin β = 1.49$ $n_{air} = 1$ $β = \sin^{-1}(\sin α/1.49)$ (Equation 1)

$L = t \times \tan(90 - β - θ)$ $θ = 90 - α$ $L = t \times \tan(+-β)$ (Equation 2)

As shown in equation 2, if the shape of light flux controlling member 100 is determined, area width L that is an adequate range for positions to form leg parts 150 is determined.

Note that flange 140 is not essential to light flux controlling member 100. The value of t in case where flange 140 is not formed is the distance between a random point in outermost rim part 110d of light controlling emission surface 110 and the foot of a perpendicular line when the perpendicular line is drawn to back surface 120.

Figure 6:
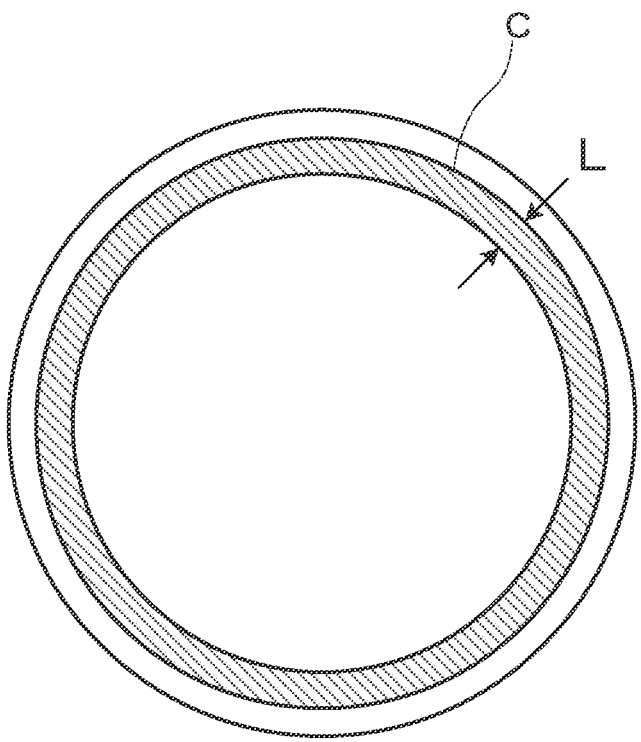
FIG. 6 schematically shows an area of area width L in a back surface of a light flux controlling member according to above Embodiment 1.
Figure 6:
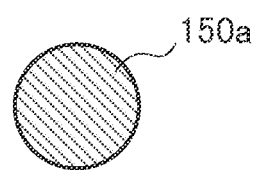
Figure 6:
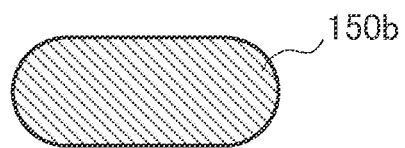

FIG. 6 schematically shows the area of area width L in back surface 120 (see FIG. 4) of light flux controlling member 100.

As shown in FIG. 6(a), light controlling emission surface 110 and flange 140 (see FIG. 4) of light flux controlling member 100 are annular, and therefore the area of area width L is distributed in a ring pattern in back surface 120 of light flux controlling member 100.

Leg parts 150 may be arranged in any positions within the range of area width L in back surface 120 of light flux controlling member 100. The shape of leg parts 150 is random, and the number of leg parts 150 is not limited. For example, as shown in FIG. 6(b), leg parts 150 may be legs 150a having a circular cross-section, and may be legs 150b having an oval arc cross-section. Further, although not shown, in the range of area width L, another aspect is possible where one circular leg part 150 is formed over the entire periphery, and yet another aspect is possible where a plurality of leg parts 150 having an arc shape seen from the center are used. With the present embodiment, from the perspectives of facilitating an operation of attaching leg parts 150 to the substrate by an adhesive, and improving stability after leg parts 150 are attached, three leg parts 150 of a round stick shape having a circular cross-section are used.

Hereinafter, the function of light flux controlling member 100 configured as described above will be explained.

The function of light flux controlling member 100 having leg parts 150 within the range of area width L will be explained with reference to FIG. 4.

Light flux controlling member 100 is an expanding lens that controls the traveling direction of a light emitted from light emitting element 3. A light incident from directly above (i.e. the light diffusing member side) light flux controlling member 100 has been considered little.

The present embodiment is directed to preventing leg parts 150 from glaring in light flux controlling member 100 when seen from directly above (i.e. the light diffusing member side) light flux controlling member 100. Accordingly, lights that are incident from directly above light flux controlling member 100 and that are parallel to the reference optical axis will be focused upon.

As shown in FIG. 4, lights that are incident from directly above light flux controlling member 100 on light controlling emission surface 110 and flange 140 and that are parallel to the reference optical axis, (1) travel inside light flux controlling member 100 without being refracted much in the vicinity of the center of first emission surface 110a and second emission surface 110b, and reach back surface 120 or concavity 130. (2) Further, in the vicinity of the outer rim of second emission surface 110b, and third emission surface 110c, the lights travel inside light flux controlling member 100 in a state where the lights are refracted toward the direction of the center of light flux controlling member 100, and are emitted outside from back surface 120. These lights that are incident from third emission surface 110c and propagate inside light flux controlling member 100 are further refracted on back surface 120 toward the reference optical axis, and are emitted. Note that, although lights incident on concavity 130 among lights incident on first emission surface 110a are scattered by concavity 130 at varying angles inside light flux controlling member 100, concavity 130 is not an adequate area to form leg parts 150 and therefore these lights are ignored. (3) Further, lights that are incident on flange 140 from directly above light flux controlling member 100 and that are parallel to the reference optical axis, propagate inside light flux controlling member 100 without being refracted, and reach back surface 120.

Eventually, while lights that are incident on light controlling emission surface 110 and flange 140 from directly above light flux controlling member 100 and that are parallel to the reference optical axis, propagate inside light flux controlling member 100 without being refracted in flange 140 and reach back surface 120, the lights travel inside light flux controlling member 100 through third emission surface 110c in a state where the lights are refracted in the direction of the center of light flux controlling member 100 and reach back surface 120. By this means, as shown in FIG. 4, a ring area of area width L, where lights that are incident from directly above light flux controlling member 100 and that are parallel to the reference optical axis do not reach, is formed in back surface 120 of light flux controlling member 100. This ring area of area width L is an area that is covered when seen from directly above (the light diffusing member side) light flux controlling member 100, and that is not directly seen.

With the present embodiment, leg parts 150 are arranged in the positions in back surface 120 of light flux controlling member 100 where this ring area is formed. Leg parts 150 fix light flux controlling member 100 to surface 17a of substrate 17 in a predetermined position and at a height. Further, leg parts 150 are glued in a state where their positions are determined on the substrate by a colored adhesive.

As described above, the positions (i.e. the ring area of area width L) in back surface 120 of light flux controlling member 100 where leg parts 150 are arranged, are in an area that is not directly seen from directly above light flux controlling member 100, and therefore are places where leg parts 150 and an adhesive do not glare. Therefore, in case where light flux controlling member 100 is mounted on the substrate, lights are absorbed by adhesive portions, so that it is possible to prevent the trouble that dark parts are produced in the display surface of light flux controlling member 100, and prevent unevenness in the uniformity of brightness due to the glueing of the leg parts.

As explained in detail above, according to the present embodiment, light flux controlling member 100 has an area of area width L inside virtual circle C on back surface 120 that adopts as the radius the distance between the reference optical axis and the foot of the perpendicular line drawn from outermost rim part 110d of third emission surface 110c to back surface 120, and has leg parts 150 of a round stick shape arranged within this area. Further, area width L is given by the following equation.

$$L = t \times \tan(\alpha - \beta)$$

t: the thickness of flange 140 or the height from back surface 120 to outermost rim part 110d.

α: the angle of incidence of light 113 that is parallel to the reference optical axis and that is incident on light controlling emission surface 110 in outermost rim part 110d.

β: the angle of emission of refracted light 115 that is generated when light 113 parallel to the reference optical axis is incident on light controlling emission surface 110 from outermost rim part 110d, and that is emitted from light controlling emission surface 110.

The above ring area of area width L is not directly seen from directly above light flux controlling member 100, and leg parts 150 are arranged in this ring area. Consequently, in case where light flux controlling member 100 is mounted on the substrate, even if adhesive portions absorb lights, leg parts 150 arranged in this ring area and the adhesive are not seen from directly above light flux controlling member 100, so that it is possible to prevent the trouble that the display surface of light flux controlling member 100 is influenced. Presently, although there are only black or thick ginger adhesives made of a thermoset resin, it is possible to mount light flux controlling member 100 on the substrate using this adhesive. A cheap thermoset resin adhesive can be used without using a special adhesive, and, consequently, can be generally implemented at low cost. As a result, it is possible to prevent unevenness in the uniformity of brightness due to the glueing of the leg parts, and have quality illumination.

Note that, although a colored adhesive is a main factor that influences the display surface of light flux controlling member 100, it cannot be said that glaring of led parts 150 themselves does not influence the display screen. With the present embodiment, it is possible to alleviate the influence such as glaring of the vicinity of leg parts 150.

Further, not all of leg parts 150 need to be accommodated within the range of area width L.

Figure 7:
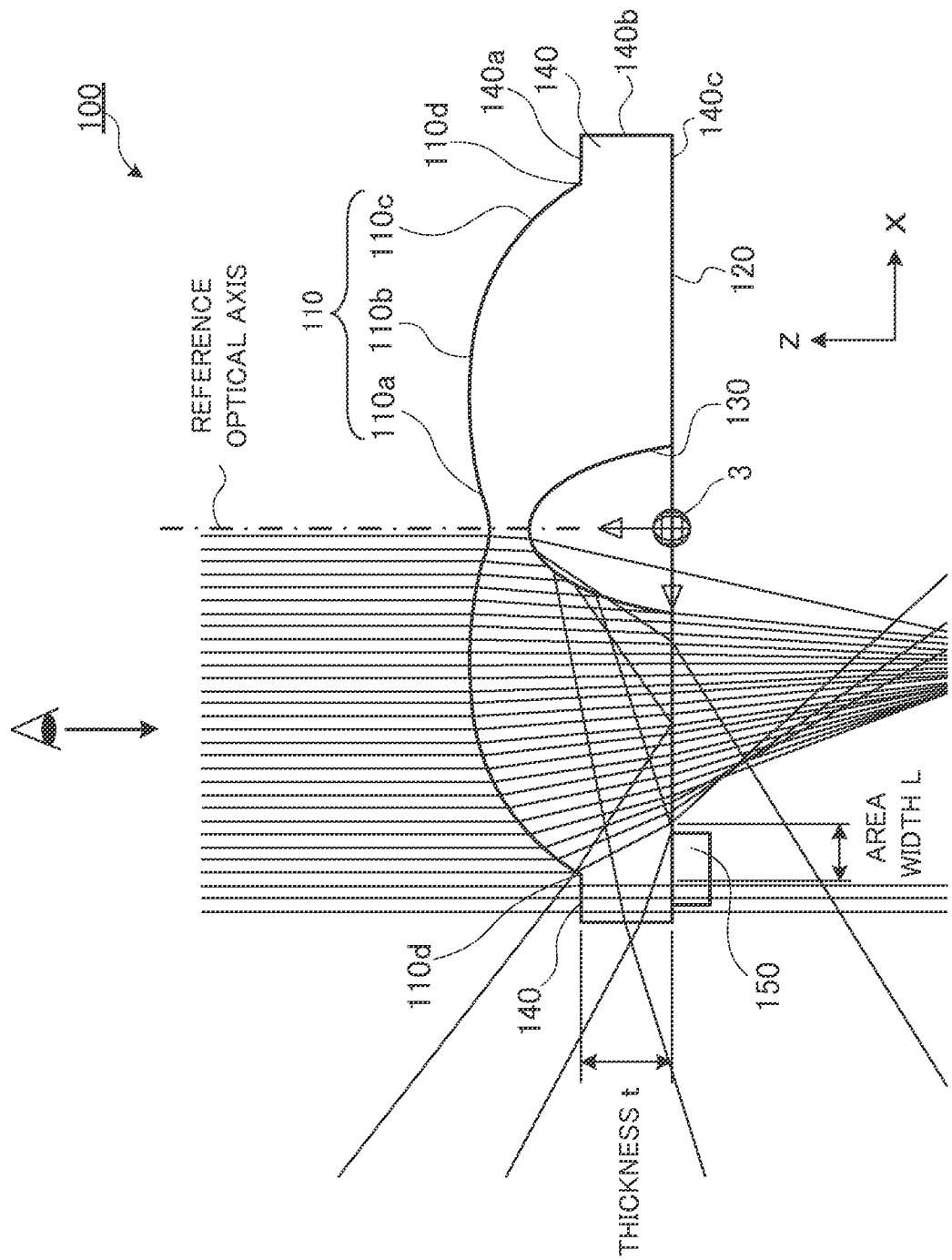
FIG. 7 shows a detailed configuration of another light flux controlling member of a surface light source apparatus forming a display apparatus according to above Embodiment 1.

FIG. 7 shows a detailed configuration of another light flux controlling member of a surface light source apparatus forming a display apparatus according to above Embodiment 1, and the same components as in FIG. 4 will be assigned the same reference numerals and the overlapping components will not be explained.

As shown in FIG. 7, even if part of leg parts 150 are formed to protrude outside area width L, as long as the extent (i.e. area) of protrusion of the leg parts from area width L into the light emitting area of the surface light source apparatus using the light flux controlling member is small, dark parts are not recognized on the light emission surface, so that it is possible to have quality illumination.

Embodiment 2

Figure 8:
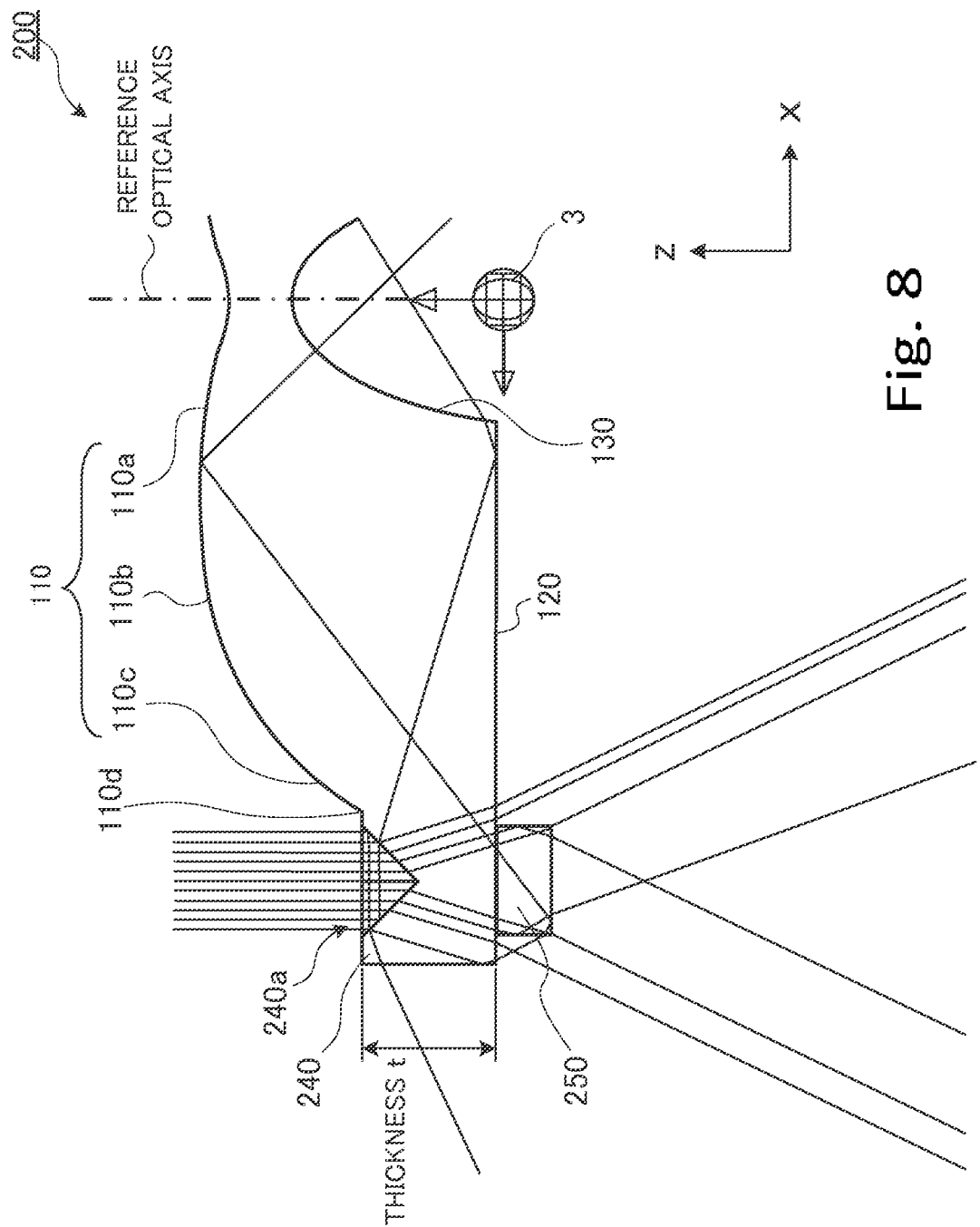
FIG. 8 shows a detailed configuration of a light flux controlling member according to Embodiment 2 of the present invention.

FIG. 8 shows a detailed configuration of a light flux controlling member according to Embodiment 2 of the present invention. In FIG. 8, the same components as in FIG. 4 will be assigned the same reference numerals, and the overlapping portions will not be explained. Light flux controlling member 200 according to the present embodiment will be used instead of light flux controlling member 4 of FIG. 1 to FIG. 3.

Light flux controlling member 200 is an expanding lens that controls the traveling direction of a light emitted from light emitting element 3, and is, for example, an aspheric lens. With light flux controlling member 200, the configuration of the expanding lens is the same as light flux controlling member 100 of FIG. 4.

Light flux controlling member 200 has: light controlling emission surface 110 that has a virtually circular planar shape and that controls the traveling direction of a light emitted from light emitting element 3; concavity 130 that allows incidence of a main beam including lights emitted in the direction of the reference optical axis among lights emitted from light emitting elements 3; and back surface 120 that radially extends from the opening rim part of this concavity 13 and that allows incidence of a subbeam emitted from light emitting element 3 at a large angle with respect to the reference optical axis. Further, light flux controlling member 200 has: flange 240 of a virtually annular shape that has V-groove 240a of a concave shape on the upper surface (i.e. on the light diffusing member side) and that projects outward of the radial direction of light controlling emission surface 110; and leg parts 250 of a round stick shape that are arranged in the positions in back surface 120 to opposite V-grooves 240a.

The upper surface (i.e. the light diffusing member side) of flange 240 that is oppositely located the positions to form leg parts 250 in the back surface (i.e. on the substrate side) has V-grooves 240a of a concave shape. V-groove 240a only needs to be a dent of a concave shape, and typically has a pyramidal shape such as a circular cone, a square pyramid and a triangular pyramid. In FIG. 8, V-groove 240a of a square pyramidal shape is formed in the upper surface of flange 240. Further, taking thickness t of flange 240 into account, the angle of the inclining surface of V-groove 240a is an inclining angle that does not allow lights incident from directly above light flux controlling member 200 to reach the positions to form leg parts 250.

Leg parts 250 fix light flux controlling member 200 to surface 17a of substrate 17 in a predetermined position and at a height, and three leg parts 250 are formed at equal intervals on the circumference of a concentric circle in the inner peripheral surface of flange part 240. Note that, in the upper surface (i.e. on the light diffusing member side) of flange 240 facing the positions to form leg parts 250, V-grooves 240a of a concave shape are formed. Leg parts 250 are glued by an adhesive in a state where the position of light flux controlling member 200 is determined in the surface of the substrate.

Figure 9:
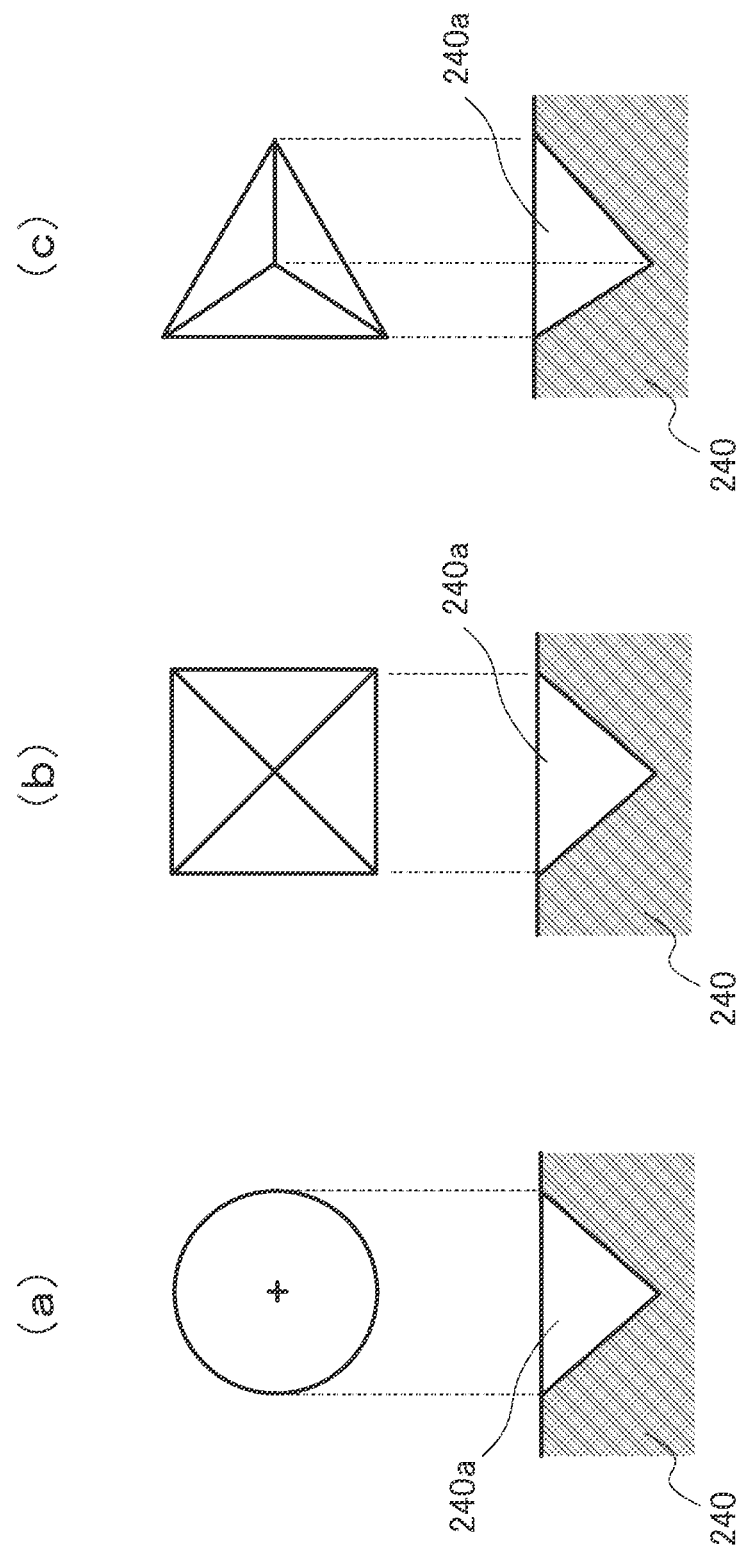
FIG. 9 illustrates a shape of a V-groove in a flange of a light flux controlling member according to above Embodiment 2, from a cross-section and an upper surface of the flange.

FIG. 9 illustrates the shape of V-groove 240a of flange 240 from the cross section and the upper surface of flange 240. As shown in FIGS. 9(a), (b) and (c), V-groove 240a of flange 240 may form a circular cone, a square pyramid or a triangular pyramid. In case of a pyramid with ridge lines such as a square pyramid or a triangular pyramid, the directions of the ridges lines of the pyramid are random. Further, V-groove structures that are not pyramids are possible.

Hereinafter, the function of light flux controlling member 200 configured as described above will be explained.

Similar to Embodiment 1, when seen from directly above (the light diffusing member side) light flux controlling member 200, the present embodiment is directed to preventing leg parts 250 from glaring in light flux controlling member 200.

As shown in FIG. 8, lights incident on flange 240 from directly above (the light diffusing member side) light flux controlling member 200, are refracted in directions hedging the center line of leg part 250 thanks to V-groove 240a of flange 240, propagate inside light flux controlling member 200 and are emitted outside from back surface 120. The lights that are refracted by V-groove 240a and that propagate inside light flux controlling member 200 are further refracted on back surface 120 in directions hedging the center line of leg part 250, and are emitted.

By this means, an area is formed in leg part 250 that is formed directly below V-groove 240a of flange 240, to which lights that are incident from directly above light flux controlling member 200 and that are parallel to the reference optical axis are not emitted. This area is an area that is covered when seen from directly above (the light diffusing member side) of light flux controlling member 200 and that is not directly seen, and consequently is a place where leg part 250 and the adhesive do not glare. Consequently, in case where light flux controlling member 200 is mounted on the substrate, even if adhesive portions absorb lights, it is possible to prevent the trouble that the display surface of light flux controlling member 200 is influenced and prevent unevenness in the uniformity of brightness due to the glueing of the leg parts, and have quality illumination.

With the present embodiment, a configuration is employed where leg parts 250 are not directly seen, by forming V-grooves 240a in flange 240. Therefore, adequate V-grooves 240a only need to be formed in flange 240, so that it is possible to improve the degree of freedom for the positions to form leg parts 250. Particularly, while, with Embodiment 1, the positions to arrange leg parts 150 (see FIG. 4) are limited to the vicinity of the end part of third emission surface 110c of light controlling emission surface 110, V-grooves 240a only need to be formed in the upper surface of flange 240 in which leg parts 250 are going to be formed, so that it is possible to improve the degree of freedom for the positions to form leg parts 250. For the same reason, the shape of flange 240 is not limited to a virtually annular shape that projects outward of the radial direction of light controlling emission surface 110. For example, a shape in which only the portions forming the above V-grooves project is possible, and leg parts 250 can be provided in positions facing these projecting portions. Thus, light flux controlling member 200 can expand general versatility upon mounting light flux controlling member 200 on the substrate.

Embodiment 3

Figure 10:
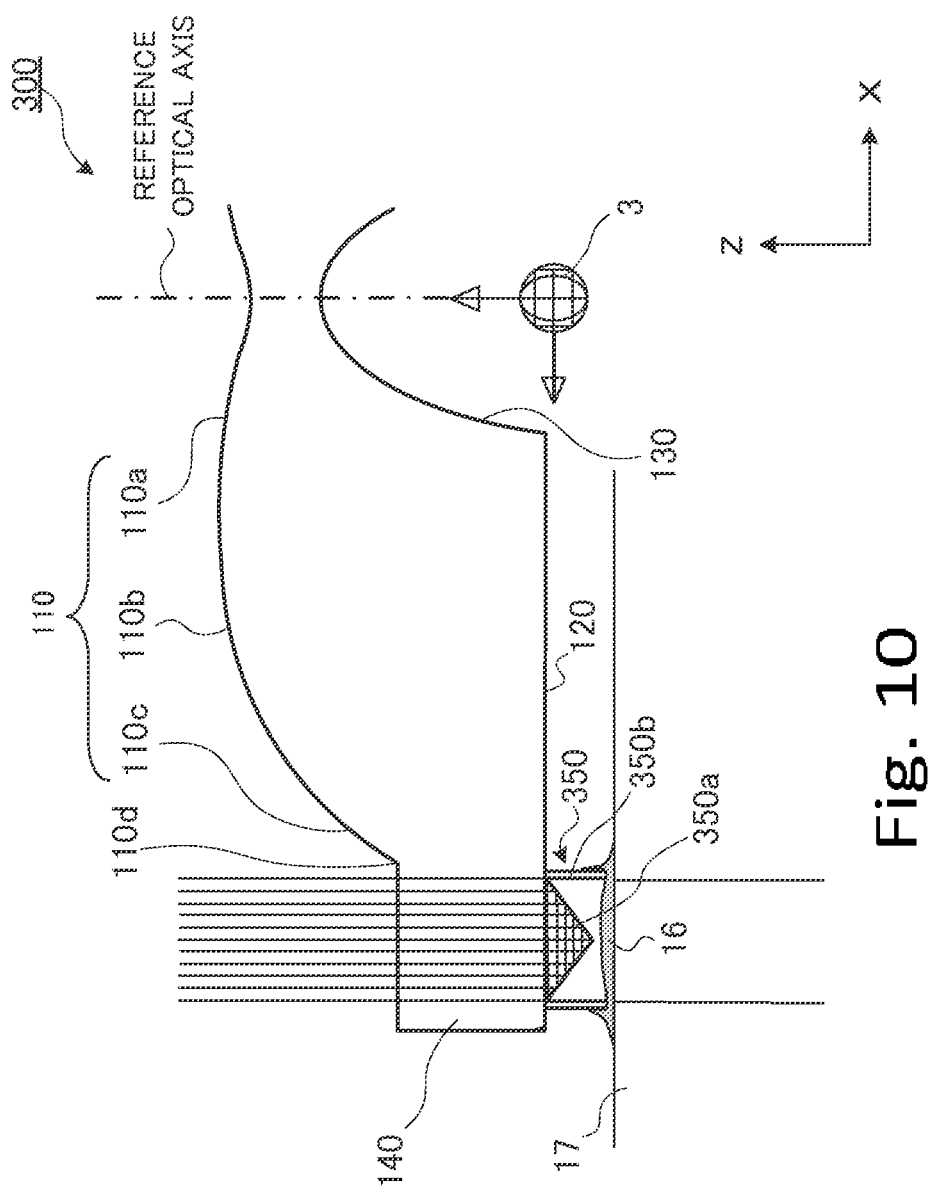
FIG. 10 shows a detailed configuration of a light flux controlling member according to Embodiment 3 of the present invention.

FIG. 10 shows a detailed configuration of a light flux controlling member according to Embodiment 3 of the present invention. The same components as in FIG. 4 will be assigned the same reference numerals, and the overlapping portions will not be explained. Light flux controlling member 300 according to the present embodiment is used instead of light flux controlling member 4 of FIG. 1 to FIG. 3.

Light flux controlling member 300 is an expanding lens that controls the traveling direction of a light emitted from light emitting element 3, and is, for example, an aspheric lens. With light flux controlling member 300, the configuration of the expanding lens is the same as light flux controlling member 100 of FIG. 4.

Light flux controlling member 300 has: light controlling emission surface 110 that has a virtually circular planar shape and that controls the traveling direction of a light emitted from light emitting element 3; concavity 130 that allows incidence of a main beam including lights emitted in the direction of the reference optical axis among lights emitted from light emitting elements 3; and back surface 120 that radially extends from the opening rim part of this concavity 13 and that allows incidence of a subbeam emitted from light emitting element 3 at a large angle with respect to the reference optical axis. Further, light flux controlling member 300 has: flange 140 of a virtually annular shape that projects outward of the radial direction of light controlling emission surface 110; and leg parts 350 of a round stick shape that have retroreflection structures in the inner hollow part.

Leg parts 350 fix light flux controlling member 300 to surface 17a of substrate 17 in a predetermined position and at a height, and three leg parts 350 are formed at equal intervals on the circumference of a concentric circle in the inner peripheral surface of flange 140. Leg parts 350 are glued by adhesive 16 in a state where the position of light flux controlling member 300 is determined in the surface of substrate 17.

Leg part 350 has: retroreflection structure 350a of a pyramidal shape denting below (toward the substrate) from back surface 120; and hollow leg part 350b of a cylindrical shape that surrounds the outer periphery of retroreflection structure 350a.

Retroreflection structure 350a only needs to adopt a pyramidal structure of a convex shape, and has a pyramidal shape such as a circular cone, a square pyramid or a triangular pyramid. In FIG. 10, retroreflection structure 350a of a square pyramidal shape is formed inside hollow leg 350b. Further, the angle of the inclining surface of retroreflection structure 350a is an inclining angle at which lights incident from directly above light flux controlling member 300 are reflected and retroreflected in retroreflection structure 350a. Note that retroreflection is possible on retroreflection structure 350a without applying, for example, coating treatment.

Figure 11:
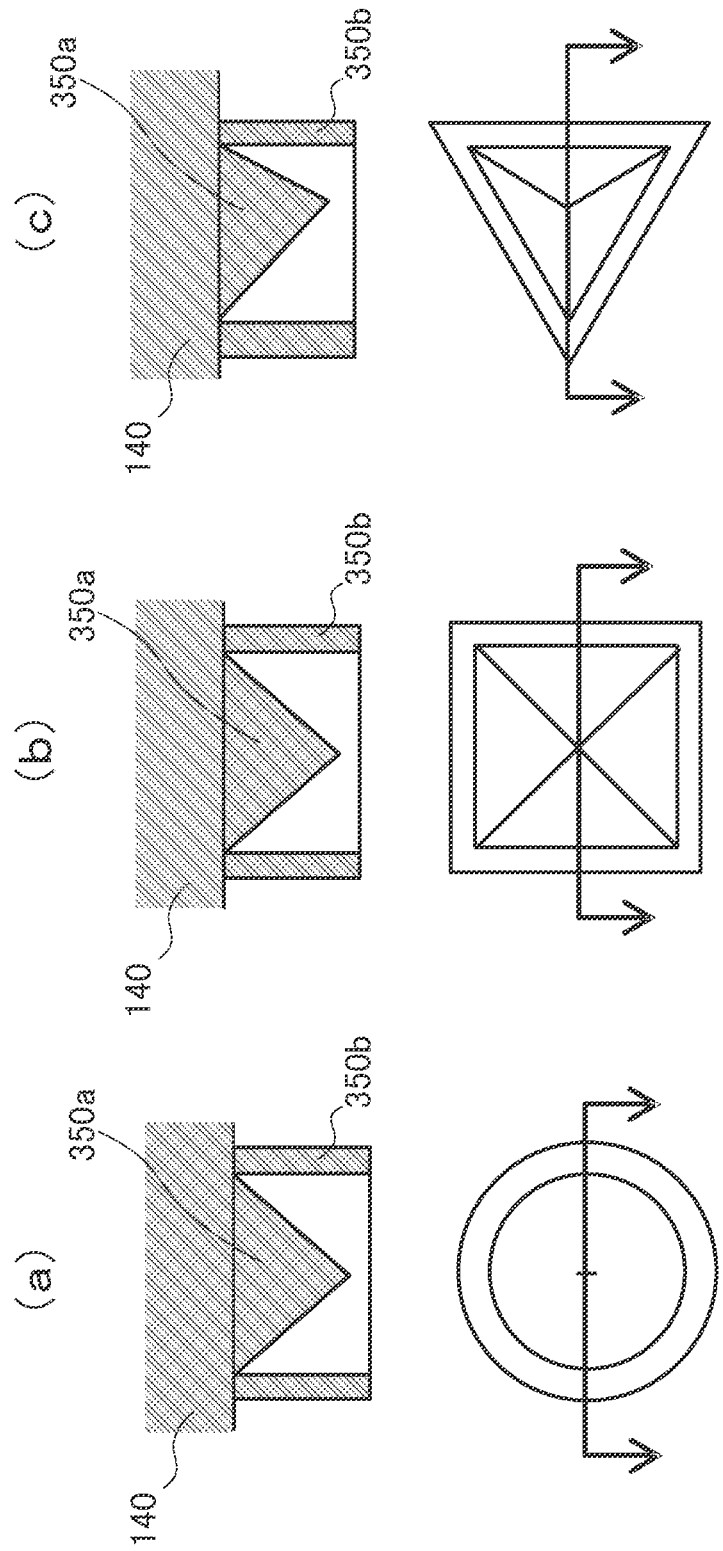
FIG. 11 illustrates a shape of a retroreflection structure of a leg part of a light flux controlling member according to above Embodiment 3, from a cross-section and a bottom surface.

FIG. 11 illustrates shapes of retroreflection structures 350a of leg parts 350 from the cross section and the bottom surface. As shown in FIGS. 11(a), (b) and (c), retroreflection structure 350a of leg part 350 may form any one of a circular cone, a square pyramid and a triangular pyramid. In case of a pyramid with ridge lines such as a square pyramid or a triangular pyramid, the directions of the ridge lines of the pyramid are random. Further, V projecting structures that are not pyramids are possible.

Figure 12:
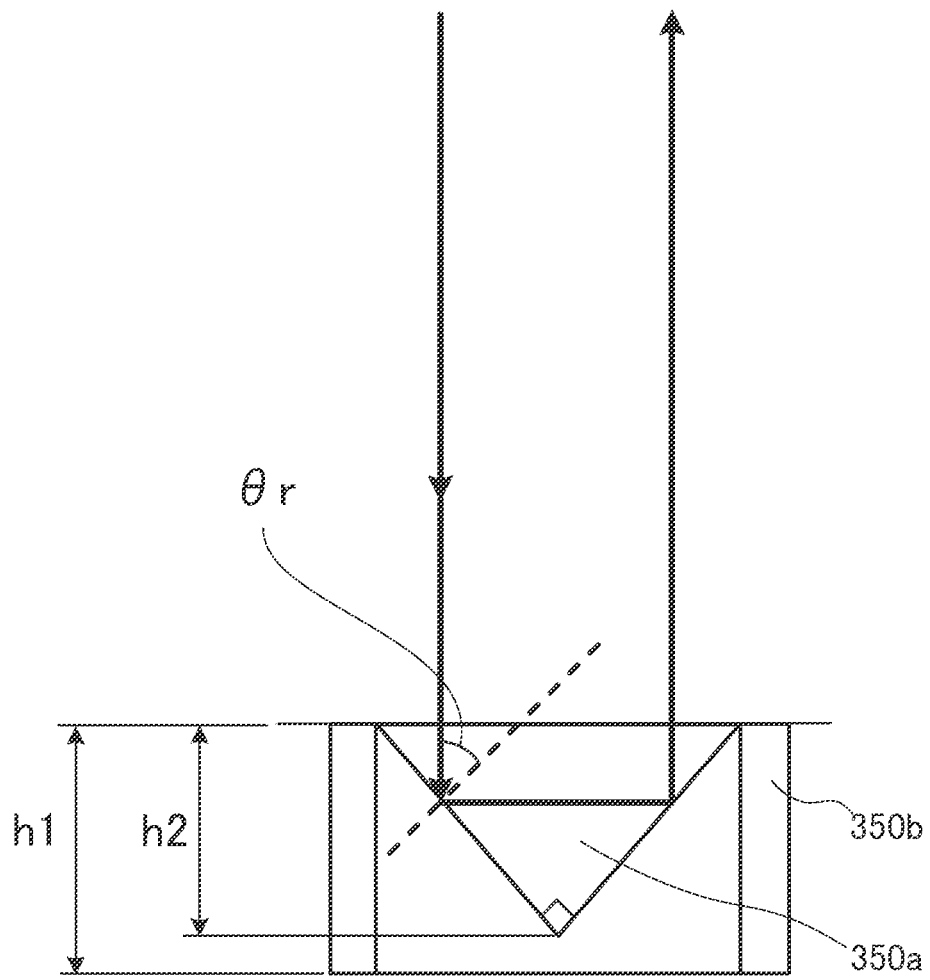
FIG. 12 illustrates a function of a retroreflection structure of a leg part of a light flux controlling member according to above Embodiment 3.

FIG. 12 illustrates the function of retroreflection structure 350a of leg part 350. As shown in FIG. 12, retroreflection structure 350a adopts a structure in which incident lights are retroreflected on the pyramidal surface and are emitted. For example, in case where the vertex angle of the pyramidal surface is 90 degrees, a structure is adopted in which lights parallel to reference optical axis L are incident on the pyramidal surface at θr=45 degrees (where the critical angle is about 42 degrees in case where a material making leg parts 350 is PMMA) which are higher than the critical angle, and are retroreflected.

Further, retroreflection structure 350a is formed shorter than hollow leg part 350b for the following reason.

That is, adhesive 16 to fix leg parts 350 to substrate 17 intrudes inside hollow leg parts 350b, and glues hollow leg parts 350b to substrate 17. Therefore, height dimension h1 of hollow leg part 350b is formed lower than height dimension h2 of retroreflection structure 350a such that the vertex part of retroreflection 350a does not touch the intruding adhesive.

Further, height dimension h2 of retroreflection structure 350a is deviced to be lower than height dimension h1 of hollow leg part 350b such that the vertex part of retroreflection structure 350a does not touch adhesive 16 to fix leg parts 350 to substrate 17.

Hereinafter, the function of light flux controlling member 300 configured as described above will be explained.

Similar to Embodiments 1 and 2, when seen from directly above (the light diffusing member side) light flux controlling member 300, the present embodiment is directed to preventing adhesive 16 to fix leg parts 350 to substrate 17, from glaring in light flux controlling member 300.

As shown in FIG. 11, lights incident from directly above (i.e. the light diffusing member side) light flux controlling member 300 propagate inside light flux controlling member 300 without being refracted, and are emitted outside from back surface 120. Here, with leg parts 350 formed in back surface 120, retroreflection structure 350a formed inside leg part 350 allow lights incident from directly above light flux controlling member 300 to retroreflect and return to the inside of light flux controlling member 300 again. The retroreflected lights propagate inside light flux controlling member 300 again, and are emitted outside from flange 140 of light flux controlling member 300.

By this means, in leg parts 350 with retroreflection structures 350a, lights incident from directly above light flux controlling member 300 are almost totally reflected, and emitted from the original incidence side.

Hence, leg parts 350 have retroreflection structures 350a to retroreflect lights having reached leg parts 350, toward the incidence side. Therefore, in case where leg parts 350 are glued to substrate 17 (see FIG. 10) by adhesive 16 (see FIG. 10), even if adhesive 16 portions form dark parts, lights propagating to leg parts 350 are retroreflected toward the incident side, so that the adhesive 16 portions are not seen from directly above light flux controlling member 300 and, consequently, it is possible to prevent the trouble that the display surface of light flux controlling member 300 is influenced.

Particularly, with the present embodiment, leg parts 350 with retroreflection structures 350a employ a configuration minimizing the area where leg parts 350 and adhesive 16 are directly seen. Accordingly, the present embodiment provides a unique advantage that leg parts 350 can be arranged in any positions. Consequently, it is possible to further improve the degree of freedom for the positions to form leg parts 350, and expand general versatility for mounting light flux controlling member 300 on the substrate.

The above explanation is an illustration of preferable embodiments of the present invention, and the scope of the present invention is not limited to this.

For example, a light diffusing member may be attached to a surface on a light emitting element side of an object-to-be-illuminated, or may be arranged on the surface side facing light emitting elements of an object-to-be-illuminated in a state where the light diffusing member is separated from the object-to-be-illuminated.

Further, with a light flux controlling member, an engraved surface may be formed in the light controlling emission surface to diffuse lights to be emitted form the light controlling emission surface.

Further, the light flux controlling member may be made of a material including a small amount of a light diffusing material (for example, silicone material or oxidized titanium).

Further, although the names "light flux controlling member," "light emitting apparatus," "surface light source apparatus" and "display apparatus" are used with the above embodiments for ease of explanation, "surface light source," "display element" and others are equally possible. A light flux controlling member may be referred to as an LED expanding lens.

INDUSTRIAL APPLICABILITY

The light flux controlling member, light emitting apparatus, surface light source apparatus and display apparatus according to the present invention can be widely used for use in various illuminations such as backlights of television monitors and monitors of personal computers, and interior display lights.

REFERENCE SIGNS LIST

1 SURFACE LIGHT SOURCE APPARATUS
2 LIGHT DIFFUSING MEMBER
3 LIGHT EMITTING ELEMENT
16 ADHESIVE
17 SUBSTRATE
100, 200, 300 LIGHT FLUX CONTROLLING MEMBER
110 LIGHT CONTROLLING EMISSION SURFACE
110a FIRST EMISSION SURFACE
110b SECOND EMISSION SURFACE
110c THIRD EMISSION SURFACE
110d OUTERMOST RIM PART
120 BACK SURFACE
130 CONCAVITY
140 FLANGE
140a FLANGE UPPER SURFACE
140b FLANGE LATERAL SURFACE
140c LOWER FLANGE SURFACE
150, 250, 350 LEG PART
240a V-GROOVE
350a RETROREFLECTION STRUCTURE
350b HOLLOW LEG PART

The invention claimed is:

1. A light flux controlling member comprising:
a light controlling emission surface that controls an emission direction of light emitted from a light emitting element;
a back surface that is oppositely located the light controlling emission surface and that forms a bottom part; and
a leg part that is formed to project from the back surface toward an opposite side of the light controlling emission surface, wherein,
in case where a light flux parallel to a reference optical axis, which is a traveling direction of light in a center of an emitted light flux, is incident on the light flux controlling member from the entire light controlling emission surface as an incident light flux, the leg part is formed in a blind angle area where the incident light flux does not directly reach the back surface from the light controlling emission surface.

2. A light emitting apparatus comprising:
a light emitting element that is aligned on a substrate and that emits light; and
a light flux controlling member that comprises:
a light controlling emission surface that controls an emission direction of light emitted from the light emitting element;
a back surface that is oppositely located the light controlling emission surface and that forms a bottom part; and
a leg part that is arranged in the back surface,
wherein the leg part is arranged within a range of area width L given according to a following equation, inside a virtual circle on the back surface, the virtual circle adopting as a radius a distance between a reference optical axis and a foot of a perpendicular line drawn from a random point on an outermost rim part of the light controlling emission surface to the back surface, $$L = t \times \tan(\alpha - \beta)$$

where:
t is a distance from the foot of the perpendicular line on the back surface to the outermost rim part;
$\alpha$ is an angle of incidence of light that is parallel to the reference optical axis and that is incident on the light controlling emission surface in the outermost rim part; and
$\beta$ is an angle of emission of a refraction light that is generated when the light parallel to the reference optical axis is incident on the outermost rim part, and that is emitted from the light controlling emission surface.

3. The light emitting apparatus according to claim 2, wherein the leg part is molded integrally with the back surface of the light flux controlling member.

4. The light emitting apparatus according to claim 2, wherein the leg part is glued on the substrate using a colored adhesive.

5. A surface light source apparatus comprising:
one of the light flux controlling member according to claim 1 and the light emitting apparatus according to claim 2; and
a light diffusing member that allows light emitted from the light emitting apparatus to be diffused and transmitted.

6. A display apparatus comprising:
the surface light source apparatus according to claim 5; and
an object-to-be-illuminated on which the light emitted from the surface light source apparatus is radiated.

7. A light emitting apparatus comprising:
a light emitting element that is aligned on a substrate and that emits light; and
a light flux controlling member that comprises:
a light controlling emission surface that controls an emission direction of light emitted from the light emitting element;
a back surface that is oppositely located the light controlling emission surface and that forms a bottom part;
a flange that projects outward of a radial direction of the light controlling emission surface; and
a leg part that is arranged in the back surface comprising the flange,
wherein the flange comprises a groove of a concave shape on the light controlling emission surface oppositely located the leg part.

8. The light emitting apparatus according to claim 7, wherein the groove is a concave that has a pyramidal shape.

9. A light emitting apparatus comprising:
a light emitting element that is aligned on a substrate and that emits light; and
a light flux controlling member that comprises:
a light controlling emission surface that controls an emission direction of light emitted from the light emitting element;
a back surface that is oppositely located the light controlling emission surface and that forms a bottom part;
a virtually annular flange that projects outward of a radial direction of the light controlling emission surface; and
a leg part that is arranged in the back surface comprising the flange,
wherein the leg part comprises a retroreflection structure to retroreflect light incident on and through the light controlling emission surface.

10. The light emitting apparatus according to claim 9, wherein the leg part comprises:
a retroreflection structure that has a convex shape projecting outward from the back surface; and
a cylindrical leg that surrounds an outer periphery of the retroreflection structure.

11. The light emitting apparatus according to claim 9, wherein the retroreflection structure is a convex that has a pyramidal shape.

* * * * *